US008793993B2

(12) United States Patent
Alexander et al.

(10) Patent No.: US 8,793,993 B2
(45) Date of Patent: Aug. 5, 2014

(54) ENERGY HARVESTING SYSTEM FOR A VEHICLE

(75) Inventors: Paul W. Alexander, Ypsilanti, MI (US); Alan L. Browne, Grosse Pointe, MI (US); Nancy L. Johnson, Northville, MI (US); Nilesh D. Mankame, Ann Arbor, MI (US); Xiujie Gao, Troy, MI (US); Geoffrey P. McKnight, Los Angeles, CA (US); Andrew C. Keefe, Encino, CA (US); Christopher P. Henry, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

(21) Appl. No.: 12/947,914

(22) Filed: Nov. 17, 2010

(65) Prior Publication Data

US 2011/0120115 A1 May 26, 2011

Related U.S. Application Data (60) Provisional application No. 61/263,306, filed on Nov. 20, 2009.

(51) Int. Cl.
*F01B 29/10* (2006.01)
*F02G 1/04* (2006.01)

(52) U.S. Cl.
USPC .......... 60/527; 60/528; 60/529; 60/616; 60/618; 60/619

(58) Field of Classification Search
USPC ............ 60/527–529, 616, 618, 619
See application file for complete search history.

(56) References Cited

U.S. PATENT DOCUMENTS 4,027,479 A * 6/1977 Cory ............... 60/527
4,117,680 A * 10/1978 Smith ............... 60/527
4,150,544 A 4/1979 Pachter
4,246,754 A * 1/1981 Wayman ............ 60/527
4,275,561 A * 6/1981 Wang ............... 60/527
4,302,938 A * 12/1981 Li .................. 60/527
4,305,250 A * 12/1981 Cory ............... 60/527
4,965,545 A * 10/1990 Johnson ........... 337/140
5,086,618 A * 2/1992 Tanaka ............. 60/527
2006/0235424 A1* 10/2006 Vitale et al. ........ 606/90
2008/0034750 A1* 2/2008 Gao et al. ......... 60/527
2009/0241328 A1* 10/2009 Saitoh et al. ...... 29/746

FOREIGN PATENT DOCUMENTS

GB         2155113 A      9/1985
WO     2005119089 A1   12/2005

* cited by examiner

*Primary Examiner* — Kenneth Bomberg
*Assistant Examiner* — Daniel Wagnitz
(74) *Attorney, Agent, or Firm* — Quinn Law Group, PLLC (57) ABSTRACT

An energy harvesting system includes a heat engine and a component configured to be driven by operation of the heat engine. The heat engine includes a first member, a second member, a shape memory alloy material, and a tensioner. The second member is spaced from the first member. The shape memory alloy material operatively interconnects the first member and the second member. The shape memory alloy material is configured to selectively change crystallographic phase from martensite to austenite and thereby contract in response to exposure to a first temperature. The shape memory alloy material is also configured to selectively change crystallographic phase from austenite to martensite and thereby expand in response to exposure to a second temperature. The tensioner is configured to apply tension to the shape memory alloy material as the shape memory alloy material selectively expands and contracts such that the shape memory alloy material is taut.

14 Claims, 3 Drawing Sheets

//ENERGY HARVESTING SYSTEM FOR A VEHICLE

CROSS-REFERENCE TO RELATED APPLICATIONS

This application claims the benefit of U.S. Provisional Patent Application Ser. No. 61/263,306, filed on Nov. 20, 2009, the disclosure of which is hereby incorporated by reference.

TECHNICAL FIELD

The present invention generally relates to an energy harvesting system for a vehicle including a heat engine with a tensioner.

BACKGROUND OF THE INVENTION

Vehicles are traditionally powered by engines, which power the vehicle and provide the power to charge a battery of the vehicle. The battery provides power for starting the engine and for operating various vehicle accessories. During operation, the engine produces a large quantity of excess heat, i.e., excess thermal energy that is typically dissipated into the atmosphere and lost. Advancements in technology and desire for driver conveniences have led to additional power loads from the accessory systems. The increased power loads have led to greater demand on the vehicle power sources. In addition, a large portion of the power from the vehicle's power sources is lost as heat.

However, arrangements for extending the fuel economy of a vehicle are desirable in light of the long standing desire for fuel efficient vehicles. Therefore, arrangements that reduce the power load and/or increase the efficiency of the vehicle's traditional power sources, such as the battery and the engine are desirable.

SUMMARY OF THE INVENTION

A heat engine includes a first member, a second member, a shape memory alloy material, and a tensioner. The second member is spaced from the first member. The shape memory alloy material operatively interconnects the first member and the second member. The shape memory alloy material is configured to selectively change crystallographic phase from martensite to austenite and thereby contract in response to exposure to a first temperature. The shape memory alloy material is also configured to selectively change crystallographic phase from austenite to martensite and thereby expand in response to exposure to a second temperature. The tensioner is configured to apply tension to the shape memory alloy material as the shape memory alloy material selectively expands and contracts such that the shape memory alloy material is taut.

An energy harvesting system includes a first fluid region, a second fluid region, a heat engine, a component, and a tensioner. The first fluid region is at one of a first temperature and a second temperature. The second fluid region is at the other of the first temperature and the second temperature. The first temperature is less than the second temperature. The heat engine includes a first member, a second member, and a shape memory alloy material. The shape memory alloy material operatively interconnects the first member and the second member. A localized region of the shape memory alloy material is configured to selectively change crystallographic phase from martensite to austenite and thereby contract in response to exposure to the first temperature. The localized region of the shape memory alloy material is also configured to selectively change crystallographic phase from austenite to martensite and thereby expand in response to exposure to the second temperature. The component is operatively connected to the first member. The first member is configured to move in response to at least one of the expansion and contraction of the shape memory alloy material such that movement of the first member drives the component. The tensioner is configured to tension the shape memory alloy material as the shape memory alloy material selectively expands and contracts.

An energy harvesting system includes a first fluid region, a second fluid region, a heat engine, a component, and a tensioner. The first fluid region is at one of a first temperature and a second temperature. The second fluid region is at the other of the first temperature and the second temperature. The first temperature is less than the second temperature. The heat engine includes a first member, a second member, and a belt. The belt includes a shape memory alloy material and operatively interconnects the first member and the second member. A localized region of the shape memory alloy material is configured to selectively change crystallographic phase from martensite to austenite and thereby contract in response to exposure to the first temperature such that the belt corresponding to a localized region of the shape memory alloy material also contracts. The localized region of the shape memory alloy material is also configured to selectively change crystallographic phase from austenite to martensite and thereby expand in response to exposure to the second temperature such that the belt corresponding to the localized region of the shape memory alloy material also contracts. The component is operatively connected to the first member. The first member is configured to move in response to at least one of the expansion and contraction of the shape memory alloy material such that movement of the first member drives the component. The tensioner is configured to tension the shape memory alloy material as the shape memory alloy material selectively expands and contracts when the expansion and contraction rates of the shape memory alloy material vary with respect to one another or vary from a nominal condition.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
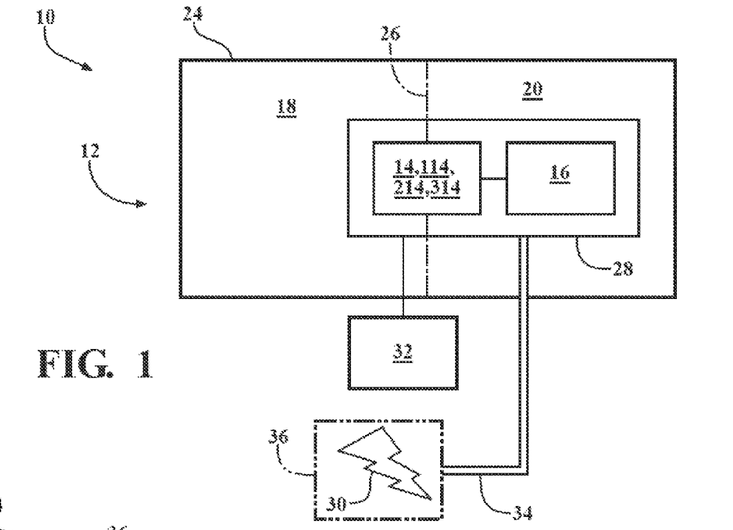
FIG. 1 is a schematic diagram of a vehicle having an energy harvesting system including a heat engine.

Referring to the Figures, wherein like reference numerals refer to like elements, a vehicle is shown generally at 10 in FIG. 1. The vehicle 10 includes an energy harvesting system 12. The energy harvesting system 12 may include a heat engine 14 and a driven component 16.

Figure 2:
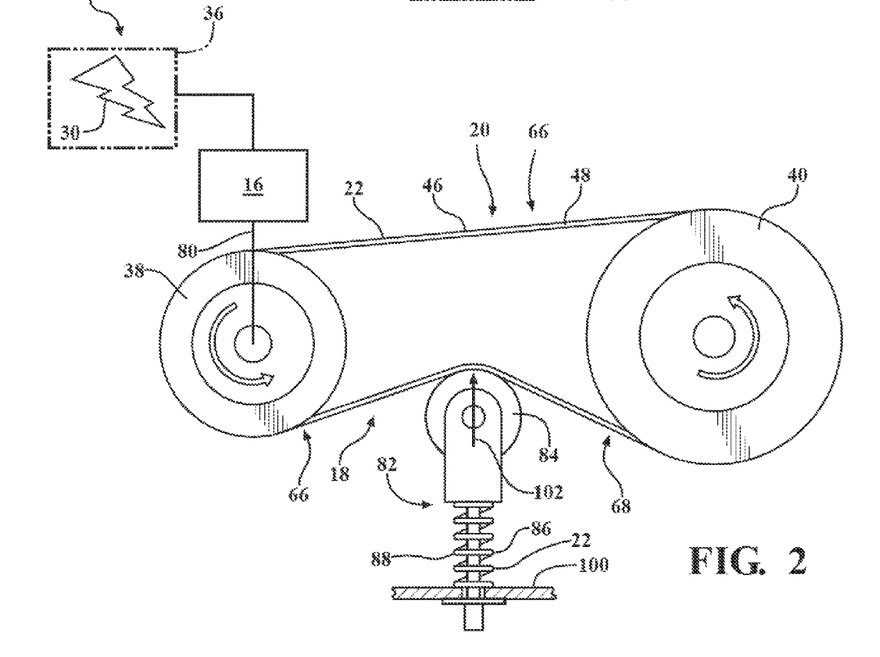
FIG. 2 is a schematic side view of a heat engine of FIG. 1 having a tensioner.

Referring to FIG. 2, the heat engine 14 includes a shape memory alloy material 22 and is operatively disposed in a first fluid region 18 and a second fluid region 20. The heat engine 14 also includes a first member 38 and a second member 40. The first member 38 is operatively disposed in the first fluid region 18 and the second member 40 is operatively disposed in the second fluid region 20. The heat engine 14 is configured to convert thermal energy, e.g., heat, to mechanical energy and from mechanical energy to electrical energy. More specifically, the energy harvesting system 12 utilizes a temperature differential between the first fluid region 18 and the second fluid region 20 to generate mechanical and/or electrical energy via the shape memory alloy material 22, as explained in more detail below.

Referring again to FIG. 1, the vehicle 10 defines a compartment 24 which may house power and drive sources for the vehicle 10, i.e., an engine and transmission (not shown), which generate heat. The compartment 24 may or may not be enclosed from the surrounding environment, and may include one or more regions and components such as an exhaust pipe, a catalytic converter, shock absorbers, brakes, and any other region where energy is dissipated, such as in a passenger compartment or a battery compartment, i.e., in an electric vehicle.

The energy harvesting system 12 is located at least partially within the compartment 24. The compartment 24 includes the first fluid region 18, having a first temperature, and the second fluid region 20, having a second temperature, different from the first temperature. The first temperature may be greater than the second temperature or vice versa.

The first fluid region 18 and the second fluid region 20 may be spaced from one another, or be separated by a sufficient heat exchange barrier 26, such as a heat shield, a Peltier device, and the like. The heat exchange barrier 26 may be employed to separate the compartment 24 into the first fluid region 18 and the second fluid region 20 such that a desired temperature differential between the first fluid region 18 and the second fluid region 20 is achieved. Fluid within the first fluid region 18 and the second fluid region 20 of the energy harvesting system 12 may be gas, liquid, or combinations thereof. When the heat exchange barrier 26 disposed between the first and second fluid regions 18, 20 is a Peltier device, the heat exchange barrier 26 is configured to generate heat on one side of the barrier 26 and to cool on an opposing side of the barrier 26. The first and second fluid regions 18, 20 may be fluidly connected to a pair of cylinder heads (not shown) that capture the energy given off from the respective fluid region 18, 20. A pump may be disposed in fluid communication with at least one of the first and second fluid regions 18, 20 and the cylinder heads to circulate and move the fluid. The energy harvesting system 12 may be configured to utilize temperature differentials between the first and second fluid regions 18, 20 in the vehicle 10 in areas such as, proximate a catalytic converter, a vehicle battery, a transmission, brakes, suspension components, i.e., a shock absorber, and/or a heat exchanger, i.e., a radiator. Additionally, the energy harvesting system 12 may be configured to utilize temperature differentials between the first and second fluid regions 18, 20 in the vehicle 10 within a battery compartment 24 for an electric vehicle or within the heat exchanger. It should be appreciated that the energy harvesting system 12 may be configured to utilize temperature differentials in other areas of the vehicle, as known to those skilled in the art. One skilled in the art would be able to determine areas having an associated temperature differential and an appropriate position for the heat engine 14 of the energy harvesting system 12 to take advantage of the temperature differentials.

The compartment 24 may be an engine compartment, where fluid within the first fluid region 18 and the second fluid region 20 is air. However, it should be appreciated that other fluids, as known to those skilled in the art, may also be used within the compartment 24. Further, the heat engine 14 and the component 16 may be surrounded by a vented housing 28. The housing 28 may define cavities (not shown) through which electronic components, such as wires may pass.

Referring to FIG. 2, the shape memory alloy material 22 is disposed in thermal contact, or heat exchange relationship, with each of the first and second fluid regions 18, 20. The shape memory alloy material 22 of the heat engine 14 has a crystallographic phase changeable between austenite and martensite in response to exposure to the first and second temperatures of the first and second fluid regions 18, 20. As used herein, the terminology "shape memory alloy" (SMA) refers to alloys which exhibit a shape memory effect. That is, the shape memory alloy material 22 may undergo a solid state phase change via molecular rearrangement to shift between a martensite phase, i.e., "martensite", and an austenite phase, i.e., "austenite". Stated differently, the shape memory alloy material 22 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material 22 begins to change from the austenite phase to the martensite phase is known as the martensite start temperature, $M_s$. The temperature at which the shape memory alloy material 22 completes the change from the austenite phase to the martensite phase is known as the martensite finish temperature, $M_f$. Similarly, as the shape memory alloy material 22 is heated, the temperature at which the shape memory alloy material 22 begins to change from the martensite phase to the austenite phase is known as the austenite start temperature, $A_s$. The temperature at which the shape memory alloy material 22 completes the change from the martensite phase to the austenite phase is known as the austenite finish temperature, $A_f$.

Therefore, the shape memory alloy material 22 may be characterized by a cold state, i.e., when a temperature of the shape memory alloy material 22 is below the martensite finish temperature $M_f$ of the shape memory alloy material 22. Likewise, the shape memory alloy material 22 may also be characterized by a hot state, i.e., when the temperature of the shape memory alloy material 22 is above the austenite finish temperature $A_f$ of the shape memory alloy material 22.

In operation, shape memory alloy material 22 that is pre-strained or subjected to tensile stress can change dimension upon changing crystallographic phase to thereby convert thermal energy to mechanical energy. That is, the shape memory alloy material 22 may change crystallographic phase from martensite to austenite and thereby dimensionally contract if pseudoplastically pre-strained so as to convert thermal energy to mechanical energy. Conversely, the shape memory alloy material 22 may change crystallographic phase from austenite to martensite and if under stress thereby dimensionally expand so as to also convert thermal energy to mechanical energy.

Pseudoplastically pre-strained refers to stretching the shape memory alloy material 22 while in the martensite phase so that the strain exhibited by the shape memory alloy material 22 under that loading condition is not fully recovered when unloaded, where purely elastic strain would be fully recovered. In the case of shape memory alloy material 22, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy material 22 transforms to its austenite phase, that strain can be recovered, returning the shape memory alloy material 22 to the original length observed prior to any load was applied. Shape memory alloy material 22 may be stretched before installation into the heat engine 14, such that a nominal length of the shape memory alloy material 22 includes that recoverable pseudoplastic strain, which provides the motion used for actuating/driving the heat engine 14. Without pre-stretching the shape memory alloy material 22, little deformation would be seen during phase transformation.

The shape memory alloy material 22 may have any suitable composition. In particular, the shape memory alloy material 22 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy material 22 can be binary, ternary, or any higher order so long as the shape memory alloy material 22 exhibits a shape memory effect, e.g., a change in shape orientation, damping capacity, and the like. A skilled artisan may select the shape memory alloy material 22 according to desired operating temperatures within the compartment 24 (FIG. 1), as set forth in more detail below. In one specific example, the shape memory alloy material 22 may include nickel and titanium.

Referring again to FIGS. 1 and 2, the driven component 16 of the energy harvesting system 12 may be configured to be driven by the mechanical energy or power generated from the conversion of thermal energy to mechanical energy within the heat engine 14. In particular, the aforementioned dimensional contraction and the dimensional expansion of the shape memory alloy material 22 may drive the component 16. The component 16 may be a simple mechanical device, such as a generator, a fan, a clutch, a blower, a pump, a compressor, and combinations thereof. It should be appreciated that the component 16 is not limited to these devices, as any other device known to those skilled in the art may also be used. The component 16 may be operatively connected to the heat engine 14 such that the component 16 is driven by the heat engine 14. More specifically, the component 16 may be part of an existing system within the vehicle 10 such as a heating or cooling system and the like. The mechanical energy provided by the shape memory alloy material 22, as described above, may drive the component 16 or may provide assistance to other systems of the vehicle 10 in driving the component 16. Driving the component 16 with mechanical energy provided by the heat engine 14 may also allow an associated existing system within the vehicle 10 to be decreased in size and/or capacity or eliminated entirely. For example, the heat engine 14 may be configured to assist in driving a fan for the heating and/or cooling system, allowing a capacity of the main heating and cooling system to be decreased, while providing weight and energy savings. Additionally, the mechanical energy produced by the energy harvesting system 12 may be used to directly drive the component 16 or be stored for later use. Therefore, the energy harvesting system 12 may be configured to provide additional energy to operate the vehicle 10 and reduce the load on a main energy source for driving the vehicle 10. Thus, the energy harvesting system 12 increases the fuel economy and range of the vehicle 10. Also, the energy harvesting system 12 may be configured to operate autonomously such that no input from the vehicle 10 is required.

When the component 16 is a generator, the component/generator 20 may be configured to convert mechanical energy from the heat engine 14 to electricity 30, as shown as 30 in FIGS. 1 and 2. The component/generator 20 may be any suitable device configured to convert mechanical energy to electricity 30. For example, the component/generator 20 may be an electrical generator that converts mechanical energy to electricity 30 using electromagnetic induction. The component/generator 20 may include a rotor (not shown) that rotates with respect to a stator (not shown) to generate electricity 30. The electricity 30 generated by the component/generator 20 may then be used to assist in powering one or more systems within the vehicle 10.

Additionally, referring to FIG. 1, the energy harvesting system 12 may include an electric control unit 32 (ECU) that is configured to control the first and second temperature of the fluid in the first and second fluid regions 18, 20, respectively. The ECU 32 may be operatively connected to the vehicle 10. The ECU 32 may be a computer that electronically communicates with one or more controls and/or sensors of the energy harvesting system 12. For example, the ECU 32 may communicate with temperature sensors within the first and/or second fluid regions 18, 20, a speed regulator of the component 16, fluid flow sensors, and/or meters configured for monitoring electricity 30 generation of the component/generator 20. Additionally, the ECU 32 may be configured to control the harvesting of energy under predetermined conditions of the vehicle 10, e.g., after the vehicle 10 has operated for a sufficient period of time such that a temperature differential between the first fluid region 18 and the second fluid region 20 is at an optimal differential. It should be appreciated that other predetermined conditions of the vehicle 10 may also be used, as known to those skilled in the art. The ECU 32 may also be configured to provide an option to manually override the heat engine 14 and allow the energy harvesting system 12 to be turned off. A clutch (not shown) may also be controlled by the ECU 32 to selectively disengage the heat engine 14 from the component 16.

As also shown in FIG. 1, the energy harvesting system 12 may also include a transfer medium 34 configured to convey electricity 30 from the energy harvesting system 12. In particular, the transfer medium 34 may convey electricity 30 from the component 16. The transfer medium 34 may be, for example, a power line or an electrically-conductive cable. The transfer medium 34 may convey electricity 30 from the generator 20 to a storage device 36, e.g., a battery for the vehicle. The storage device 36 may be located proximate to, but separate from, the vehicle 10. Such a storage device 36 may allow the energy harvesting system 12 to be utilized, for example, with a parked vehicle 10. In another example, the energy harvesting system 12 may be configured to take advantage of a temperature differential created by a sun load on a hood for the corresponding compartment 24 and convert the mechanical energy created from the temperature differential into electrical energy 30 to be stored within the storage device 36.

It is to be appreciated that for any of the aforementioned examples, the vehicle 10 and/or the energy harvesting system 12 may include a plurality of heat engines 14 and/or a plurality of component 16. That is, one vehicle 10 may include more than one heat engine 14 and/or component 16. For example, one heat engine 14 may drive more than one component 16. Likewise, the vehicle 10 may be configured to include more than one energy harvesting system 12, where each energy harvesting system 12 includes at least one heat engine 14 and at least one component 16. The use of multiple heat engines 14 may take advantage of multiple regions of temperature differentials throughout the vehicle 10.

Further, the shape memory alloy material 22 may change both modulus and dimension upon changing crystallographic phase to thereby convert thermal energy to mechanical energy. More specifically, the shape memory alloy material 22, if pseudoplastically pre-strained, may dimensionally contract upon changing crystallographic phase from martensite to austenite and may dimensionally expand, if under tensile stress, upon changing crystallographic phase from austenite to martensite to thereby convert thermal energy to mechanical energy. Therefore, when a temperature differential exists between the first temperature of the first fluid region 18 and the second temperature of the second fluid region 20, i.e., when the first fluid region 18 and the second fluid region 20 are not in thermal equilibrium, respective localized regions 66, 68 of the shape memory alloy material 22 disposed within the first and/or second fluid regions 18, 20 may respectively dimensionally expand and contract upon changing crystallographic phase between martensite and austenite.

The first and/or second members 38, 40 may be a pulley, a gear, a one-way clutch, a spring, and the like. The one-way clutch is configured to allow rotation of the members 38, 40 in only one direction. Referring to FIG. 2, the first member 38 is operatively connected to the component 16 such that as the first member 38 is induced to move or rotate as a result of the dimensional change of the shape memory alloy material 22, rotation of the first member 38 drives the component 16. Although two members 38, 40 are shown in FIG. 2, it should be appreciated that more or less members 38, 40 may be used, as known to those skilled in the art.

Figure 5:
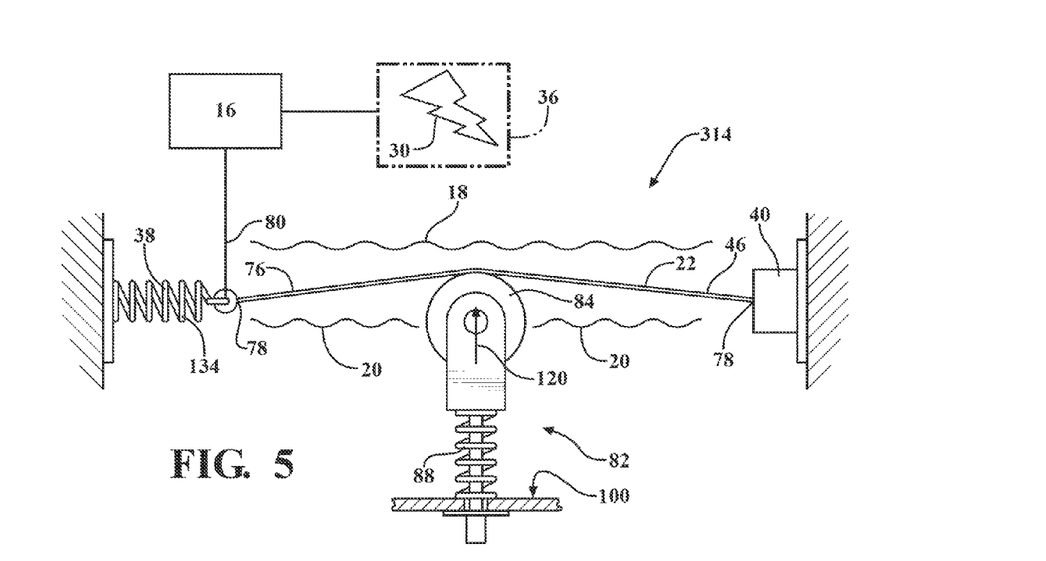
FIG. 5 is a schematic side view of another heat engine of FIG. 1 having a tensioner.

The shape memory alloy material 22 operatively interconnects the first member 38 and the second member 40. The shape memory alloy material is configured to selectively change crystallographic phase from martensite to austenite and thereby contract in response to exposure to a first temperature. Likewise, the shape memory alloy material is also configured to selectively change crystallographic phase from austenite to martensite and thereby expand in response to exposure to a second temperature. The resulting dimensional change of the shape memory alloy material 22 may induce movement of one or more of the members 38, 40. The shape memory alloy material 22 may be embedded within a belt 46. More specifically, the shape memory alloy material 22 may be configured as a longitudinally extending wire that is embedded within the belt 46 such that the belt 46 longitudinally expands and contracts as a function of the associated shape memory alloy material 22 may also expanding and contracting. The shape memory alloy material 22 may be a wire that has any desired cross-sectional shape, i.e., round, rectangular, octagonal, ribbon, or any other shape known to those skilled in the art. Additionally, the belt 46 may be at least partially formed from a resilient material. For example, the resilient material may be an elastomer, a polymer, combinations thereof, and the like. The belt 46 may be formed as a continuous loop, as shown in FIG. 2, or as an elongated strip, as shown in FIG. 5. It should be appreciated that the belt 46 may be formed in any other configuration, as known to those skilled in the art.

Referring to the heat engine 14 shown in FIG. 2, a localized region 66 of the belt 46 may be disposed within the first fluid region 18 such that the first temperature causes that corresponding localized region 66 of the shape memory alloy material 22 to either longitudinally expand or contract as a function of the first temperature of the first fluid region 18. Likewise, another localized region 68 of the shape memory alloy material 22 may be similarly disposed within the second fluid region 20 such that the second temperature causes that localized region 68 of the shape memory alloy material 22, along with the associated portion of the belt 46, to either longitudinally expand or contract as a function of the second temperature of the second fluid region 20. For example, if the first temperature of the first fluid region 18 or the second fluid temperature of the second fluid region 20 is in the cold state, the associated localized region 66 of the shape memory alloy material 22 comprising the shape memory alloy material 22 and the associated portion of the belt 46 will longitudinally expand as a result of a phase change of the shape memory alloy material 22 from the austenite phase to the martensite phase. However, if the first temperature of the first fluid region 18 or the second temperature of the second fluid region 20 is in the hot state, the associated localized region 66 of the shape memory alloy material 22, and the associated belt 46, will longitudinally contract as a result of a phase change of the shape memory alloy material 22 from the martensite phase to the austenite phase.

One or more of the first and/or second members 38, 40 may be movably connected to the component 16. It should be appreciated that the first and/or second members 38, 40 may be connected to more than one component 16, as understood by those of skill in the art. For example, the first members 38 may be operatively connected to the component 16 via a drive shaft 80 or through any other type of interconnection known to those skilled in the art. More specifically, referring to FIG. 2, the first member 38 may be rotatably connected to the component 16 such that rotation of the first member 38 also drives the component 16. The belt 46 may be a continuously looped belt 48 that may be looped about each of the first and second members 38, 40 such that motion imparted from the belt 46 causes rotation of each of the first and second members 38, 40. The longitudinal expansion and/or contraction of the localized regions 66, 68 of the shape memory alloy material 22 impart motion from the belt 46 to the first and/or second member 38, 40 to move or drive the component 16 via the drive shaft 80. Accordingly, the belt 46 may be configured to continuously rotate about the first and second members 38, 40 in response to exposure to the first and second temperatures such that a plurality of localized regions 66, 68 of the belt 46 continuously move into and out of the first and second fluid regions 18, 20. The localized regions 66, 68 are those portions of the belt 46 that are in the respective first and second fluid regions 18, 20 at any given moment.

The continuous expansion and contraction of the localized regions 66, 68 of the shape memory alloy material 22 of the belt 46 may cause the belt 46 to be slack. In order to keep the belt 46 taut, the heat engine 14 may also include a tensioner 82 that is configured to apply tension to the belt 46 as localized regions 66, 68 of the shape memory alloy material 22 dimensionally expands and/or contract. In the embodiments shown in FIGS. 2-5, the tensioner 82 includes a tensioning element 84 and a biasing device 86. The tensioning element 84 is configured to apply tension to the belt 46. Applying tension to the belt 46 keeps the belt 46 taut, i.e., free from slack. Additionally, an amount of tension applied to the belt 46 may be selectively varied. The tensioning elements 84 may be a pulley or any other rigid or semi-rigid element that is configured to apply tension to the belt 46. The biasing device 86 is configured to bias the tensioning element 84 into contact with the belt 46. The biasing device 86 may be a spring, i.e., coil spring (as shown at 88 in FIGS. 2 and 5), leaf spring, rings (as shown at 90 and 92 in FIG. 3), guide elements (as shown at 94 and 96 in FIG. 3), linear actuators (as shown at 98 in FIG. 4), and the like. Alternatively, the biasing device 86 is formed from shape memory alloy material 22 configured to be in its austenitic state—i.e. in which the shape memory alloy material 22 exhibits a super-elastic response. In this embodiment, the biasing device may be formed as a spring, which would provide a fully autonomous nearly constant tensioning force over a wide range of displacement. The biasing device 86 is configured to be operably disposed between the tensioning element 84 and a reaction surface 100 such that the biasing device 86 reacts against the reaction surface 100 to bias the tensioning element 84 into contact with the belt 46. The reaction surface 100 may be any surface that does not move with respect to the belt 46 and/or the tensioning element 84.

Referring specifically to the heat engine 14 shown in FIG. 2, the first member 38 is rotatably spaced from the second member 38. The first and second members 38, 40 may be pulleys. However, it should be appreciated that the first and/or second members 38, 40 may be any other rotatable member as known to those of skill in the art. The continuously looped belt 48 extends about the first and second members 38, 40. The first member 38 and the associated localized region 66 of the continuously looped belt 48 are disposed in the first fluid region 18 at one of the first and second temperature. Likewise, the second member 40 and the associated localized region 68 of the continuously looped belt 48 are disposed in the second fluid region 20 at the other of the first and second temperature. The component 16 is operatively coupled to the first member 38. Rotation of the first member 38, via the expansion and contraction of the localized regions 66, 68 of the shape memory alloy material 22 of the belt 46 is caused by the temperature differential between the first fluid region 18 and the second fluid region 20. The rotation of the first member 38 drives the component 16 to generate electricity.

In the embodiment shown in FIG. 2, the biasing device 86 of the tensioner 82 is operatively disposed between the reaction surface 100 and the tensioning element 84. The biasing device 86 applies a force 102 to the tensioning element 84, which biases the tensioning element 84 away from the reaction surface 100 and into contact with the continuously looped belt 48 such that tension is applied from the tensioning element 84 to the continuously looped belt 48. The tensioner 82 is configured to maintain the continuously looped belt 48 in tension, i.e., free of slack, as the localized regions 66, 68 of the continuously looped belt 48 continuously expand and contract to induce movement of the first and second members 38, 40 The biasing device 86 may be a coil spring 88. It should be appreciated that other biasing devices 86, as known to those of skill in the art may also be used.

Figure 3:
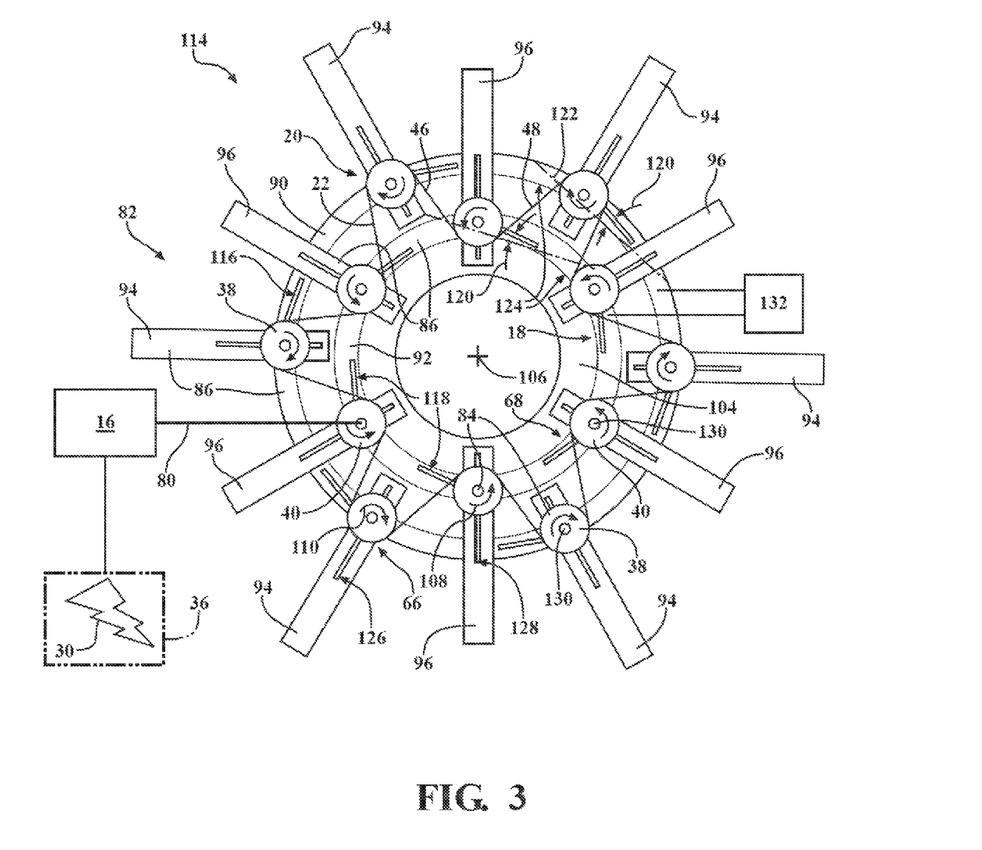
FIG. 3 is a schematic side view of another heat engine of FIG. 1 having a tensioner.
Figure 4:
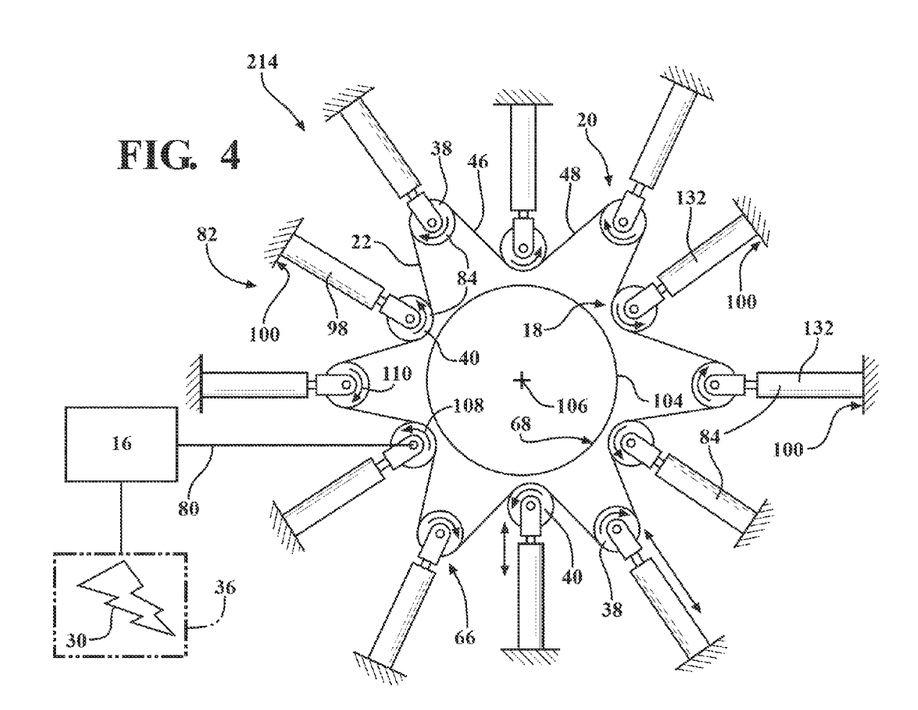
FIG. 4 is a schematic side view of yet another heat engine of FIG. 1 having a tensioner.

Referring to the embodiments of the heat engines 114, 214 shown in FIGS. 3 and 4, a plurality of first and second members 38, 40 are disposed in spaced relationship to one another and surround a centrally located heat source 104. The first members 38 may each be disposed in alternating relationship with each of the second members 40. More specifically, each of the first and second members 38, 40 may be disposed in alternating relationship to one another about a central axis 106. The heat source 104 may be centered along the central axis 106 to provide uniform temperatures to the second members 40 surrounding the central axis 106. Additionally, the second members 40 are radially disposed closer to the central axis 106 than the first members 38. The first and second members 38, 40 are configured to rotate with respect to one another. The first and second members 38, 40 may be pulleys, wheels, gears, and the like.

The continuously looped belt 48 sequentially extends in alternating fashion about each of the first and second members 38, 40 to surround the central axis 106. The belt 46 sequentially extends about the alternating plurality of first and second members 38, 40 such that each of the plurality of first members 38 rotate in a first direction 108 and each of the plurality of second members 40 rotate in a second direction 110, opposite the first direction 108, as indicated in FIGS. 3 and 4. It should be appreciated that the directions indicated in FIGS. 3 and 4 may optionally be opposite that which is shown, so long as the first and second directions 108, 110 are opposite one another.

The tensioner 82 is configured to radially vary a distance between the first and second members 38, 40 to continuously apply tension to the belt 46 via the tensioning elements 84, i.e., the first and second members 38, 40. In the embodiments shown in FIGS. 3 and 4, the second members 40 are radially disposed closer to the heat source 104 than the first members 38. Therefore, the second members 40 are at a higher temperature than the first members 38. More specifically, the first members 38, and the associated localized regions 66, are operatively disposed in the first fluid region 18 at the second temperature such that linear expansion of the localized regions 66 occurs to move the associated first members 38. Likewise, the second members 40, and the associated localized regions 68 of the continuously looped belt 48 are operatively disposed in the second fluid region 20 at the first temperature such that linear contraction of the associated localized regions 68 occurs to move the associated second members 40.

Alternatively, although not shown in FIGS. 3 and 4, the heat source 104 may be configured to surround the heat engine 114, 214 such that the first members 38 are at a higher temperature than the second members 40. In this example, the first members 38, along with the associated localized regions 68 of the continuously looped belt 48, are at the first temperature and the second members 40, along with the associated localized regions 66 of the continuously looped belt 48, are at the second temperature.

Referring specifically to the embodiment shown in FIG. 3, the biasing device 86 of the tensioner 82 may include a first ring 90 and a second ring 92. The first ring 90 surrounds the central axis 106 and defines a plurality of first spline tracks 116 circumferentially surrounding the central axis 106. The first and second members 38, 40 may act as individual tensioning elements 84 to apply tension to the continuously looped belt 48. The first members 38 may be movably disposed in a respective one of the plurality of first spline tracks 116. The second ring 92 surrounds the central axis 106 and is coaxially disposed within the first ring 90 and defines a plurality of second spline tracks 118 circumferentially surrounding the central axis 106. Each of the second members 40 may be movably disposed in a respective one of the second spline tracks 118. Each of the first and second spline tracks 116, 118 extends at an acute angle 120, relative to a respective imaginary line 122 that extends tangential to an inner surface 124 of each of the respective first and second rings 90, 92.

The biasing device 86 of the tensioner 82 also includes a plurality of first and second guide elements 94, 96 that are operably disposed between the respective tension element 84 and reaction surface 100. The first and second guide elements 94, 96 are equal to the number of respective first and second members 38, 40. The first guide elements 94 each define a first guide track 126. Likewise, the second guide elements 96 each define a second guide track 128. The first and second elements 94, 96 each extend radially away from the central axis 106. Each of the first elements 94 is disposed axially adjacent a respective one of the first members 38 and the first ring 90. For example, each of the first elements 94 may be axially disposed between the first ring 90 and the respective first member 38. Each of the second elements 96 is disposed axially adjacent a respective one of the second members 40 and the second ring 92. Likewise, by way of example, each of the second elements 96 may be axially disposed between the second ring 92 and the respective second member 40. Axles 130 may extend through each of the first members 38 and the respective first spline track 116 and first guide track 126. Additionally, axles 130 may extend through each of the second members 40 and the respective second spline track 118 and second guide track 128.

The axles 130 allow the first and second members 38, 40 to rotate relative to the respective rings 90, 92 and guide elements 94, 96, while also extending into the respective tracks 116, 118, 126, 128 to movably interconnect the members 38, 40 with the respective rings 90, 92 and guide elements 94, 96. The axles 130 of the first members 38 are configured to slidably move within the respective first spline tracks 116 and first guide tracks 126, relative to the first ring 90 and first guide element 94, respectively, such that each of the first members 38 move radially away from the central axis 106 to apply tension to the belt 46. Likewise, each of the second members 40 is configured to move within the respective second spline tracks 118 and the second guide tracks 128, relative to the second ring 92 and the second guide element 96, respectively, such that each of the second members 40 moves radially toward the central axis 106 to apply tension to the belt 46.

Movement of the first and second members 38, 40 within the respective tracks 116, 118, 126, 128 may be facilitated by rotating the first and/or second ring 90, 92 about the central axis 106 with an actuator 132 or biasing element. In this embodiment, each of the first and second guide elements 94, 96 are prevented from rotating relative to the central axis 106, while being configured to move radially toward and away from the central axis 106. Rotation of the first ring 90 about the central axis 106 causes each of the first members 38 to move within the respective first spline track 116, while being guided radially, with respect to the central axis 106, within the respective first guide track 126 of the restrained first guide element 94. As a result, the first member 38 applies tension to the belt 46 as the shape memory alloy material 22 longitudinally expands and contracts. Likewise, rotation of the second ring 92 about the central axis 106 causes each of the second members 40 to move within the respective second spline track 118, while being guided radially, with respect to the central axis 106, within the respective second guide track 128 of the restrained second guide element 96. As a result, the second member 40 applies tension to the belt 46 as the shape memory alloy material 22 longitudinally expands and contracts. Therefore, radial movement of the first and/or second guide element 94, 96 is facilitated by rotating only the first and/or second ring 90, 92 about the central axis 106. Additionally, the actuator 132 may be operatively connected to the ECU 32 that is configured to control actuation of the actuator 132 to rotate the first and/or second ring 90, 92 about the central axis 106 to vary the axial position of the first and/or second members 38, 40 to control the tension applied to the belt 46.

Alternatively, the first and second rings 90, 92 and the first and second guide tracks 126, 128 may be independently rotatable about the central axis 106. In this embodiment, the first and/or second guide elements 94, 96 may also move radially toward and away from the central axis 106 while the first and/or second rings 90, 92 rotate about the central axis 106. The radial movement of the first and/or second guide elements 94, 96 causes the respective first and/or second members 38, 40 to move within the respective first or second guide tracks 126, 128 and to move radially with respect to the central axis 106, while causing the respective first and/or second rings 90, 92 to rotate about the central axis 106. The movement of the rings 90, 92 and the guide elements 94, 96 causes the members 38, 40 to apply tension to the continuously looped belt 48 as the shape memory alloy material 22 longitudinally expands and contracts.

The first and second rings 90, 92, in combination with the first and second guide elements 94, 96, provides uniform radial movement of the respective first and second members 38, 40, when applying tension to the continuously looped belt 48. Therefore, movement of the first ring 90 about the central axis 106 uniformly moves each of the first members 38 radially toward or away from the central axis 106, depending on the direction of rotation. Likewise, movement of the second ring 92 about the central axis 106 uniformly moves each of the second members 40 radially toward or away from the central axis 106, depending on the direction of rotation of the respective ring 90, 92.

Referring now to the heat engine 214 shown in FIG. 4, the tensioner 82 may include a plurality of linear actuators 98. Each linear actuator 98 is independently operatively connected to a respective one of the first and second members 38, 40. The linear actuators 98 are configured to radially move a respective first or second member 38, 40, i.e., tensioning elements 84, toward or away from the central axis 106 to apply tension to the continuously looped belt 48 as the shape memory alloy material 22 longitudinally expands and contracts. The linear actuators 98 may be any type of linear actuator 98 known to those of skill in the art that is operably disposed between the tensioning element 84 and the reaction surface 100. The linear actuators 98 may be operated by hydraulics, electricity, pneumatics, and the like. The linear actuators 98 may also be operatively connected to the ECU 32 that is configured to control movement of the linear actuators 98 and vary the axial position of the first and/or second members 38, 40 and control the tension in the belt 46. Using the linear actuators 98 may allow for non-uniform radial movement of one or more of the first and/or second members 38, 40 relative to the others of the first and/or second members 38, 40 to independently apply tension to the continuously looped belt 48.

Referring to the embodiment of a heat engine 314 shown in FIG. 5, the shape memory alloy material 22 may be configured to be disposed as a longitudinal strip 76 that is not looped and that extends between a pair of ends 78. In this embodiment, the longitudinal strip 76 may be configured such that each end 78 of the longitudinal strip 76 is operatively attached to a respective member 38, 40 such that expansion and/or contraction of the longitudinal strip 76 acts on one or both of the members 38, 40. One of the members 38, 40 may be a linear spring 134 that is operatively connected to the component 16 via the drive shaft 80 and the like. The longitudinal strip 76 may be operatively disposed between the first and second fluid regions 18, 20. By way of a non-limiting example, the first fluid region 18 may be at the first temperature and the second fluid region 20 may be at the second temperature, where the first temperature is greater than the second temperature. As the longitudinal strip 76 and the first fluid region 18 are brought into proximity to one another, the first temperature of the first fluid region 18 acts on the shape memory alloy material 22 of the longitudinal strip 76 such that the shape memory alloy material 22 and the longitudinal strip 76 longitudinally contracts. Likewise, as the longitudinal strip 76 and the second fluid region 20 are brought into proximity to one another, the second temperature of the second fluid region 20 acts on the shape memory alloy material 22 of the longitudinal strip 76 such that the shape memory alloy material 22 and the longitudinal strip longitudinally expand. Longitudinal expansion and contraction of the longitudinal strip 76 act on the linear spring 134 to drive the component. However, the longitudinal expansion and contraction can also cause the longitudinal strip 76 to become slack. Therefore, the tensioner 82 is configured to apply tension to the belt such that the belt 46 is taut. The tensioning element 84 of the tensioner 82 acts on the belt 46, i.e., the shape memory alloy material 22, to keep the belt 46 in tension. The biasing device 86 reacts against the reaction surface 100 to continuously bias the tension element into contact with the shape memory alloy material 22 as the shape memory alloy material 22 longitudinally expands and contracts.

While the best modes for carrying out the invention have been described in detail, those familiar with the art to which this invention relates will recognize various alternative designs and embodiments for practicing the invention within the scope of the appended claims.

The invention claimed is:

1. A heat engine comprising:
a plurality of first members;
a plurality of second members disposed in spaced and alternating relationship to the plurality of first members;
wherein each of the plurality of first members and the plurality of second members are rotatable;
a shape memory alloy material forming a continuous loop;
wherein the shape memory alloy material sequentially extends about the alternating plurality of first members and second members such that the shape memory alloy material operatively interconnects the plurality of first members and the plurality of second members;
wherein each of the plurality of first members rotates in a first direction as each of the plurality of second members rotates in a second direction, opposite the first direction;
wherein the shape memory alloy material is configured to selectively change crystallographic phase from martensite to austenite and thereby contract in response to exposure to a first temperature; and
wherein the shape memory alloy material is also configured to selectively change crystallographic phase from austenite to martensite and thereby expand in response to exposure to a second temperature; and
a tensioner configured to apply tension to the shape memory alloy material as the shape memory alloy material selectively expands and contracts such that the shape memory alloy material is taut and at a predefined stress level;
wherein the tensioner is selectively actuatable such that the tension applied to the shape memory alloy material by the tensioner is selectively controlled.

2. A heat engine, as set forth in claim 1, wherein the tensioner includes:
a tensioning element configured to tension the shape memory alloy material; and
a biasing device;
wherein the biasing device is configured to bias the tensioning element into contact with the shape memory alloy material.

3. A heat engine, as set forth in claim 2, wherein the biasing device is a spring.

4. A heat engine, as set forth in claim 2, wherein the biasing device is formed from the shape memory alloy material in an austenitic state.

5. A heat engine, as set forth in claim 1, wherein the tensioner is configured to vary a distance between the plurality of first members and the plurality of second members to tension the shape memory alloy material.

6. A heat engine, as set forth in claim 5, wherein each of the plurality of first members has a temperature that is substantially equal to one of the first temperature and the second temperature and each of the plurality of second members has a temperature that is substantially equal to the other of the first temperature and the second temperature.

7. A heat engine, as set forth in claim 6, wherein each of the plurality of first and second members is disposed in alternating relationship to one another about a central axis;
wherein each of the plurality of first members is radially disposed closer to the central axis than each of the plurality of second members.

8. A heat engine, as set forth in claim 6, wherein the tensioner is configured to radially move at least one of the plurality of first and second members to tension the shape memory alloy material.

9. A heat engine, as set forth in claim 8, further comprising:
a first ring surrounding a central axis and defining a plurality of first spline tracks;
wherein each of the plurality of first members is movably disposed in a respective one of the plurality of first spline tracks; and
a second ring surrounding the central axis and coaxially disposed within the first ring and defining a plurality of second spline tracks;
wherein each of the plurality of second members is movably disposed in a respective one of the plurality of second spline tracks;
wherein each of the plurality of first and second spline tracks extend at an acute angle, relative to a line extending tangential to an inner surface of each of the respective first and second rings;
wherein each of the first plurality of members is configured to move within the respective first spline tracks, relative to the first ring, such that each of the first members moves radially with respect to the central axis to tension the shape memory alloy material; and
wherein each of the second plurality of members is configured to move within the respective second spline tracks, relative to the second ring, such that each of the second members moves radially with respect to the central axis to tension the shape memory alloy material.

10. A heat engine, as set forth in claim 8, wherein the tensioner includes a linear actuator operatively connected to each of the plurality of first and second members to radially move each of the plurality of first and second members with respect to a central axis to tension the shape memory alloy material.

11. A heat engine, as set forth in claim 1, wherein at least one of the first member and second member is one of a spring, a wheel, and a one-way clutch.

12. A heat engine comprising:
a plurality of first members;
a plurality of second members disposed in spaced and alternating relationship to the plurality of first members;

wherein each of the plurality of first members and the plurality of second members are rotatable;
a shape memory alloy material forming a continuous loop;
wherein the shape memory alloy material sequentially extends about the alternating plurality of first members and second members such that the shape memory alloy material operatively interconnects the plurality of first members and the plurality of second members;
wherein each of the plurality of first members rotates in a first direction as each of the plurality of second members rotates in a second direction, opposite the first direction;
wherein the shape memory alloy material is configured to selectively change crystallographic phase from martensite to austenite and thereby contract in response to exposure to a first temperature; and
wherein the shape memory alloy material is also configured to selectively change crystallographic phase from austenite to martensite and thereby expand in response to exposure to a second temperature; and
a tensioner configured to apply tension to the shape memory alloy material as the shape memory alloy material selectively expands and contracts, such that the shape memory alloy material is taut and at a predefined stress level;
wherein the tensioner includes:
  a tensioning element configured to tension the shape memory alloy material; and
  a biasing device;
  wherein the biasing device is configured to bias the tensioning element into contact with the shape memory alloy material; and
  wherein the biasing device is formed from the shape memory alloy material in an austenitic state.

13. A heat engine comprising:
a plurality of first members;
a plurality of second members disposed in spaced and alternating relationship to the plurality of first members;
wherein each of the plurality of first members and the plurality of second members are rotatable;
a shape memory alloy material forming a continuous loop;
wherein the shape memory alloy material sequentially extends about the alternating plurality of first members and second members such that the shape memory alloy material operatively interconnects the plurality of first members and the plurality of second members;
wherein each of the plurality of first members rotate in a first direction as each of the plurality of second members rotates in a second direction, opposite the first direction;
wherein the shape memory alloy material is configured to selectively change crystallographic phase from martensite to austenite and thereby contract in response to exposure to a first temperature; and
wherein the shape memory alloy material is also configured to selectively change crystallographic phase from austenite to martensite and thereby expand in response to exposure to a second temperature;
wherein each of the plurality of first members has a temperature that is substantially equal to one of the first temperature and the second temperature and each of the plurality of second members has a temperature that is substantially equal to the other of the first temperature and the second temperature; and
a tensioner configured to radially move at least one of the plurality of first and second members to vary a distance between the plurality of first members and the plurality of second members to apply tension to the shape memory alloy material as the shape memory alloy material selectively expands and contracts such that the shape memory alloy material is taut and at a predefined stress level;
wherein the tensioner includes a linear actuator operatively connected to each of the plurality of first and second members to radially move each of the plurality of first and second members with respect to the central axis to tension the shape memory alloy material.

14. An energy harvesting system, as set forth in claim 13, wherein the tensioner includes:
a tensioning element configured to tension the belt; and
a biasing device;
wherein the biasing device is configured to bias the tensioning element into contact with the belt.

* * * * *